Nov. 4, 1969  J. HISZPANSKI  3,475,957
SUBMARINE NAVIGATION DEVICE FOR A SELF-DEPENDENT DIVER
Filed Feb. 14, 1966

INVENTOR
JAN HISZPANSKI
BY Irwin A. Lavine
ATTORNEY

3,475,957
SUBMARINE NAVIGATION DEVICE FOR A SELF-DEPENDENT DIVER

Jan Hiszpanski, Gdynia, Poland, assignor to Zaklady Mechaniki Precyzyjnei-Przedsiebiorstwo Panstwowe Gdansk-Oliwa, Poland
Filed Feb. 14, 1966, Ser. No. 527,268
Int. Cl. G01c 21/00, 17/08
U.S. Cl. 73—180                          6 Claims

ABSTRACT OF THE DISCLOSURE

A navigation device for divers including a compass pivotally mounted on an outrigger attached to the diver's body, and including a pointer fixed to the outrigger; also, an embodiment in which the compass is fixed to the outrigger and the pointer is pivotally mounted on the compass. Movement of the pivotally mounted member is caused by a fin attached thereto.

---

The aim of this invention is to enable a scuba diver to have exact control over the course along which he is moving. Thus, the device permits travelling fairly long distances beneath the surface of the water and maintaining a plotted course without geographic orientation.

Up to now, divers have been using bracelet-compasses which do not offer any precise device for submarine directional orientation. They indicate the directions of the earth but they do not indicate whether or not the diver is swimming along the plotted course. This results from the fact that the diver usually moves transversely relative to the longitudinal axis of his body. Apart from this, when reading the compass on his arm, the diver turns his head to the left or to the right whereby he loses orientation as to where the longitudinal axis of his body lies. The reading of the course is done on the basis of the presumed point of intersection of the wind rose of the compass and of the longitudinal axis of the diver's body or of the line parallel to it, passing through the centre of the rose. The total deviation from the traced course, being the sum of errors of the transverse movement and of the error resulting from the difficulty of fixing the axis of the body, is great. The deviation does not permit travelling long distances under water along a fixed course and the reaching of the intended destination. Notice is to be taken that the directional orientation and the control of the submarine travel meet with great difficulties, especially when the bottom is invisible, in case of darkness, limited water transparency etc. The bracelet-compass is inconvenient also in that the diver does not observe it continuously but only from time to time when reading the compass indications.

It was unexpectely found out that it is possible to construct a simple device for submarine navigation for a scuba diver which device permits not only the fixation of the diver's swimming course but also provides a continuous control of the course, and beyond this the device is useful as an artificial horizon.

The essence of the invention consists in providing the measuring device with a stationary member fixed to an outrigger head of the diver's face and with a movable member rotationally fixed to the stationary member. The movable member is provided with a fin setting the direction of said member parallel to the direction of the diver's motion.

The disadvantages and inconveniences of bracelet-compasses are removed by the device of the present invention. This device, equipped with a compass, is placed ahead of the diver's face on the extension of the axis of his body. The rotational compass housing connected with the fin automatically sets itself parallel to the direction of the diver's motion in the water. The diver reads from the compass the real direction of his motion at a given moment, regardless of his swimming parallel to the axis of his body or traversely thereto. The reading is exact and the establishment of the longitudinal axis of the diver's body is not required. The device is placed in the diver's field of view and permits a continuous control of the course, and this not only during occasional readings. The device can be set at different distances free from the diver's face, depending on the visibility, water transparency and individual diver's requirements. The device enables the diver to make, prior to diving, exact course bearings in relation to the destination.

The device according to the invention comprises an appliance 1 fixed to an outrigger composed of a flexible member 2 as well as a rigid member 3.

Figure 1:
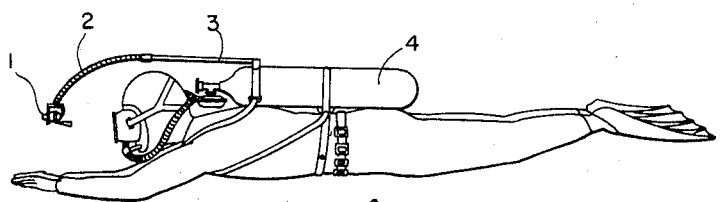
FIG. 1 is an elevational view of a scuba diver equipped with a device in accordance with the present invention.
Figure 2:
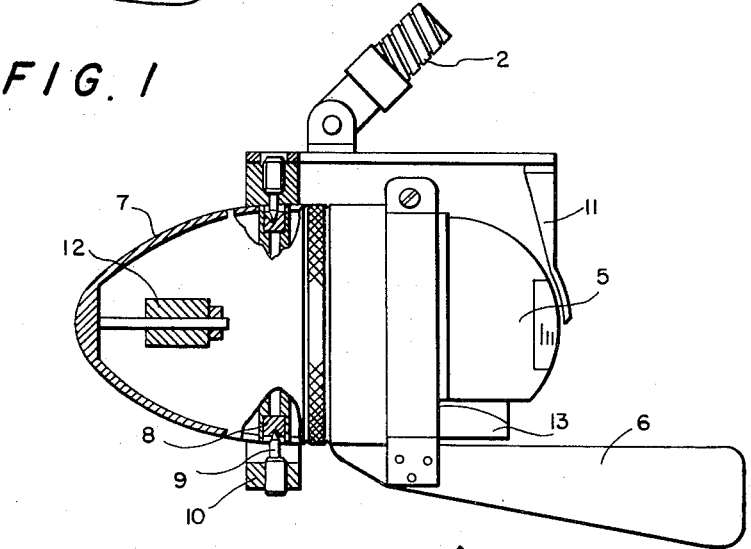
FIG. 2 is an enlarged elevational view, partly in section, of the device of the present invention.

The outrigger is fixed to the diving apparatus 4. As shown in FIG. 2, a component part of the device is a compass 5 of the aviation type capable of lateral reading i.e. with a movable wind rose on a rotatable cylindrical surface. The compass 5 is connected with a fin 6, the plane of which is parallel to the longitudinal axis of the compass. The compass 5 together with the housing 7 is rotationally mounted in a ring-like frame 10 by means of two bearings composed of shells 8 and pins 9. In this way the compass has one degree of freedom in relation to frame 10. To the ring-like frame 10 a reading pointer 11 and the flexible member 2 of the outrigger are fixed.

In the inside of the housing 7 there is rotationally mounted on a threaded pin a weight 12 provided for exactly statically balancing in water the device in relation to the axis of rotation.

An integral part of the compass 5 is the compensation device 13 for removing any deviation.

The operation of the device according to the invention is as follows.

While the diver is moving, the compass 5 has its axis automatically maintained parallel to the direction of the diver's movement this resulting from the force of the water on the fin 6 connected to the compass 5 which fin thereby produces a moment adverse to every deviation from the direction of the movement and correcting the position of the compass. Reading of the real course of the diver's movement takes place with the aid of pointer 11. As the appliance 1 of the device is placed ahead of the diver's face in the field of his continuous view, the compass 5 additionally fulfills the function of an artificial horizon e.g. of a device indicating to the diver his inclination in relation to the horizontal plane. The inclination is indicated by the different position of the wind rose in the reading window. Hence, if the swimmer's movement is at an angle to the direction in which he is heading, that is, the longitudinal axis of his body, that movement will cause lateral forces to be exerted on the fin 6, thereby swinging the compass 5 on the pins 9; this will be readily apparent to the non-alignment of the compass 5 with the pointer 11. The swimmer may then take corrective action to prevent such movement, and the compass 5 will then realign itself with the pointer 11. Also, the direction of heading of the swimmer will be always provided by the compass 5 and the conventional lubber line with which it is equipped after the swimmer has taken such action.

In order to prevent the tendency to deviation from the real course of the movable member of the device, which fact might arise when the diver tilts sideways, the movable member is statically balanced in relation to the axis of rotation by means of a shiftable weight 12. The balancing is carried out in water in accordance with the salinity of the water.

Figure 3:
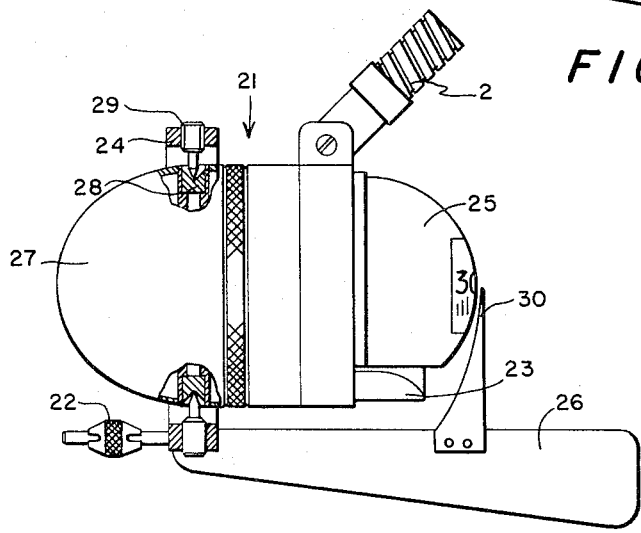
FIG. 3 is an enlarged elevational view, partly in section, of an alternate embodiment of the present invention.

The modification of the device according to the invention as shown in FIG. 3 consists of the appliance 21 fixed to the outrigger 2 in front of the diver's head. In the housing 27 of the appliance 21 the compass 25 is mounted. The appliance and the compass are the stationary parts of the device. Movable parts of the device are the fin 26 and the ring-shaped frame 24 which is rotationally mounted on the housing 27 with the aid of a bearing in the form of a shell 28 and pin 29.

The weight 22 is provided for exact static balancing of the appliance in relation to the axis of rotation, and is fixed in front of the fin 26.

The compensation device 23 provides for elimination of any deviation.

The pointer 30 for reading the indications on the scale of the compass 25 is fixed to the fin 26.

The operation of the modification of the device is the same as that above described.

I claim:
1. A submarine navigation device for a diver comprising:
 (a) an outrigger and means for mounting said outrigger to the body of a diver so that the outrigger extends to a position ahead of a diver's face when so mounted,
 (b) a compass comprising a housing and a movable wind rose therewithin,
 (c) means for securing said compass housing to said outrigger for pivotal movement about an axis which is vertical when the diver is generally horizontal with his chest down,
 (d) a fin connected to said compass housing for causing said compass housing to move about said axis with the relative direction of flow of the water,
 (e) and a pointer fixed relative to said outrigger and closely adjacent to the face of the housing and normally central of the compass wind rose as viewed by the diver.

2. The device of claim 1, said securing means comprising ring carried by said outrigger, and pivot pins connecting said compass housing to said ring.
3. The device of claim 2, and shiftable weight means for balancing the weight of said compass relative to said pivot pins.
4. A submarine navigation device for a diver comprising:
 (a) an outrigger and means for mounting said outrigger to the body of a diver so that the outrigger extends to a position ahead of a diver's face.
 (b) a compass comprising a housing and a movable wind rose therewithin,
 (c) means for fixedly attaching said compass housing to said outrigger,
 (d) a fin having a pointer mounted thereon which pointer is closely adjacent to the face of the housing and normally central of the compass rose as viewed by the diver,
 (e) and means for pivotally mounting said fin and pointer on said compass housing for movement about an axis which is vertical when said diver is in horizontal, chest down position.

5. The device of claim 4, said means for mounting said fin and pointer on said compass housing comprising a ring carrying said fin and pivot pins connecting said compass housing to said ring.
6. The device of claim 5, and shiftable weight means for balancing the weight of said fin and pointer relative to said pivot pins.

References Cited

UNITED STATES PATENTS

| 177,869 | 5/1876 | McNabb | 73—180 |
| 2,941,307 | 6/1960 | Frisbie | 33—223 |
| 3,209,464 | 10/1965 | Glatt | 33—222 X |

FOREIGN PATENTS

| 34,544 | 12/1964 | Germany. |
| 407,021 | 12/1909 | France. |

ROBERT B. HULL, Primary Examiner

U.S. Cl. X.R.

33—223